Figure 1:
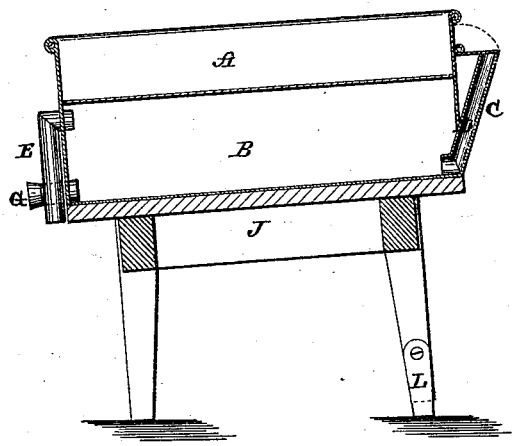
Figure 2:
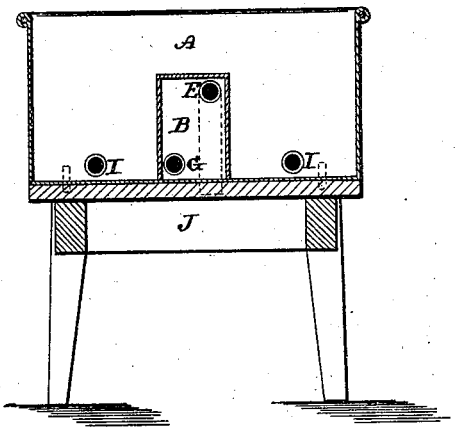

C. C. EDDY & D. H. FOSTER.
MILK-COOLERS.

No. 183,384.  Patented Oct. 17, 1876.

WITNESSES:
F. M. Burnham,
Jno. Wm Garnier

INVENTORS
C. C. Eddy
D. H. Foster
per
F. A. Lehmann, atty.

UNITED STATES PATENT OFFICE.

CORTIS C. EDDY AND DWIGHT H. FOSTER, MEXICO, NEW YORK.

IMPROVEMENT IN MILK-COOLERS.

Specification forming part of Letters Patent No. 183,384, dated October 17, 1876; application filed September 2, 1876.

*To all whom it may concern:*

Be it known that we, CORTIS C. EDDY and DWIGHT H. FOSTER, of Mexico, in the county of Oswego and State of New York, have invented certain new and useful Improvements in Milk-Cooler; and we do hereby declare the following to be a full, clear, and exact description of the invention, such as will enable others skilled in the art to which it pertains to make and use it, reference being had to the accompanying drawings, which form part of this specification.

The nature of our invention consists in the construction and arrangement of a milk-cooler, as will be hereinafter more fully set forth.

In the annexed drawings, which fully illustrate our invention, A represents the vat or pan for holding the milk, said vat being made preferably in rectangular form, as shown.

B represents a water-reservoir formed in the center of the pan, and extending the entire length thereof from end to end. This reservoir extends from the bottom upward for a suitable distance—say, about two-thirds the height of the pan, more or less. The pan is thus divided by the water-reservoir so as to actually make a double number of pans. This is of great importance in dairies where, for in-instance, one set of four pans is used, as the amount of milk from a given number of cows varies at different seasons, and by our invention both a large and small quantity can be accommodated without letting the milk be too shallow.

The pan with central water-reservoir is also adapted for cheese-making, as its form is convenient for working the curd, and the milk can very readily be heated by either water or steam.

The position of the reservoir is such that it cools both from the sides and upward, thus obtaining the full benefit of the cooling process in the shortest possible time, and, being inclosed, the hot air has no effect upon the cold water.

At one end of the reservoir B, on the outside of the pan A, is formed a receiving-funnel, C, which is an accommodation for those who have no running water, but are obliged to get the supply from wells. By the use of this funnel the water can be poured directly into the reservoir, thus obviating both the expense and use of a water-supply tank. Inside of the funnel C is the supply-pipe D, discharging at the bottom of the reservoir, to be used where running water is at hand by connecting with a hose. At the other end of the reservoir is the waste-pipe E, discharging from the top. By this arrangement of the supply and discharge pipes, when running water is used, we get the most uniform circulation and the entire benefit of the water used. The water-reservoir is also, at the same end as the waste-pipe E, provided with an outlet, G, near the bottom for drawing off all the water from the reservoir. At this end of the pan are also outlets I I from the two compartments of the pan for drawing off the milk.

The milk-cooler thus constructed rests upon an ordinary table, J, one leg of which is provided with an extension, L, pivoted to it, to be thrown down for quickly raising the vat or pan at one end when desired to draw off the milk.

Having thus fully described our invention, what we claim as new, and desire to secure by Letters Patent, is—

In combination with the pan A and central longitudinal reservoir B, the funnel C, pipe D, entering at one end of the reservoir, waste-pipe E, discharging from the top of the other end, discharge-pipes G I, and a table, J, provided with an elevating device, L, at one end, substantially as shown and described.

In testimony that we claim the foregoing we have hereunto set our hands and seals this this 25th day of August, 1876.

CORTIS C. EDDY, [L. S.]
  DWIGHT H. FOSTER. [L. S.]

Witnesses:
 C. C. BROWN,
 E. RULISON.